United States Patent [19]

Richter et al.

[11] Patent Number: 5,681,453
[45] Date of Patent: Oct. 28, 1997

[54] RECIPROCAL MOVABLE SCREENS IN A VERTICALLY ELONGATED VESSEL

[75] Inventors: Johan Richter, Oslo; Ole Richter, Karlstad, both of Sweden

[73] Assignee: Kvaerner Pulping Technologies Aktiebolag, Sweden

[21] Appl. No.: 522,355

[22] Filed: Sep. 13, 1995

[51] Int. Cl.⁶ .................. B01D 21/24; B01D 24/30
[52] U.S. Cl. .................. 210/97; 210/388; 210/391; 210/456; 162/251
[58] Field of Search .................. 210/354, 388, 210/391, 97, 315, 333.01, 357, 448, 456; 162/251, 233, 238, 247

[56] References Cited

U.S. PATENT DOCUMENTS

| | | |
|---|---|---|
| 3,752,319 | 8/1973 | Richter .................. 210/357 |
| 4,029,579 | 6/1977 | Jacobsen et al. .................. 210/77 |
| 4,396,509 | 8/1983 | Foyn .................. 210/315 |
| 4,529,482 | 7/1985 | Richter .................. 210/338 |
| 4,637,878 | 1/1987 | Richter et al. .................. 210/388 |
| 5,547,570 | 8/1996 | Richter .................. 210/333.01 |

*Primary Examiner*—Ana Fortuna
*Attorney, Agent, or Firm*—Ronald P. Kananen

[57] ABSTRACT

This invention relates to a vertical vessel, particularly a continuous pulp digestion vessel, wherein fiber materials suspended in liquid pass downwardly past screens through which treatment liquid is withdrawn. The screens are reciprocated vertically up and down utilizing a piston and cylinder assembly. The piston moves downwardly on the pressure from a pump and returns upwardly on the influence of the interior digester pressure during normal digester operation. The positioning of the pistons on the inside of the screens provides many advantages.

14 Claims, 2 Drawing Sheets

RECIPROCAL MOVABLE SCREENS IN A VERTICALLY ELONGATED VESSEL

BACKGROUND AND SUMMARY OF THE INVENTION

In many situations where fluid, particularly liquid, is screened from a suspension, problems of screen clogging are common. Especially if some of the particles in the material being screened are fine, they have a tendency to clog up the screen slots or openings, resulting in greatly reduced efficiency or stoppage of the screening process.

Problems with screen clogging are especially prevalent in vertical vessels for passing fibrous material suspended in liquid, particularly pulp digesters, such as continuous digesters. Normally the pulp moves downwardly in the vessel under the influence of gravity, and must overcome the wall friction which increases; substantially at the screens. Also, slight counter-current flows are provided in parts of the vessel, and there can be a tendency to floatation of the material particles due to the presence of gases. All of these problems, especially the wall friction problem, compound when there is a high content of fines in the pulp material. The result is that the force of gravity may not be sufficient to overcome all of the countervailing forces, and the column of material can stop moving. This is called "hangup", or "hanging", i.e. the column is "hesitating".

Once the material column stops moving, the screens will clog up solidly, and the entire vessel must be shut down until the problem is corrected. Alternatively, there have been numerous installations in the past that have utilized a variety of flow control mechanisms to try to prevent screen clogging, typical conventional flow mechanisms being illustrated U.S. Pat. Nos. 2,695,232 and 3,711,367. Also, there has been provided a specialized screen having some stationary and some movable parts, the movable parts being pivotal about a generally horizontal axis in response to a horizontal force applied by a cylinder or the like, such as shown in U.S. Pat. No. 3,752,319.

Further from U.S. Pat. No. 4,637,878 there is known a vessel having screens that are vertically movable. The screens are powered by means of pistons. These pistons are operated on one side (the up-stroke) by means of the pressure from the vessel. Since these pistons are positioned in the screening volume of the vessel, i.e. on the outside of the movable screens, their function will be dependent on the differential pressure over the screen. As a consequence it has been shown that a digester fitted with this kind of screen assembly faces several problems. Firstly there could be a problem with insufficient pressure/flow to the pistons for moving the screens upwardly within the desired time interval, e.g. 1 second. Furthermore there is a problem with tilting of the screen assemblies. A tilting may be caused due to the fact that the piston is attached to the screen on its convex side.

The present invention mainly deals with solving the latter problems but, of course, also deals with resolving the problem related to hanging and provides a relatively simple apparatus and method, utilizable in a wide variety of vessels and environments. The invention is readily adaptable for retrofitting to existing installations, and finds particular applicability in both continuous and batch pulp digesting vessels.

The structure according to the present invention is provided in a vertical vessel for vertically passing fibrous material suspended in liquid, the vessel having a vertical wall curved about a vertical axis. The structure includes a vertically elongated screening member, curved about a vertical axis. Preferably a plurality of such members are mounted in the vessel around the interior perimeter thereof, and normally provide for the withdrawal of treatment fluid at various stages of the material processing. Means are provided for mounting the screening members inside and adjacent the vertical wall of the vessel for up and down reciprocal movement, defining a screening volume between the screening member and the vertical wall, add for substantially sealing the volume between the screening member and the vertical wall from the interior of the vessel, except through the screening member and slots of about 2–5 mm clearance between the screen elements and the walls of the vessel, during reciprocation of the screening member. Means are provided for reciprocating the screening member vertically up and down with respect to the vertical wall.

The reciprocating means preferably comprises a single piston and cylinder assembly mounted on the inside of and above each screening member, with the underside of the piston in open connection to the digester pressure. Means are provided for operatively attaching the piston to the screening member, such as universal joint means. A fluid channelling means which is interconnected with a pressure controlling means is operatively connected to the top of the cylinder. Means are provided for selectively connecting the pressure controlling means to a source of fluid under pressure, such as a high pressure liquid pump, or to a vent, such as a flash tank. The entire screen assembly may be provided as an insert.

In practicing a method according to the invention, fibrous material, such as comminuted fiber material, is passed vertically downwardly in a vessel, past screens disposed around the vessel periphery. The screens are reciprocated in the same direction of movement as the pulp, proper cleaning of the screens resulting. The screens are not moved positively by an actuator in both directions. The screens are only moved downwardly by an actuator, but upwardly by digester pressure.

It is the primary object of the present invention to provide a simple and effective structure for keeping screens in digesters, or the like, from clogging and tilting. This and other objects of the invention will become clear from an inspection of the detailed description of the invention, and from the appended claims.

DETAILED DESCRIPTION OF THE DRAWINGS

Figure 1:
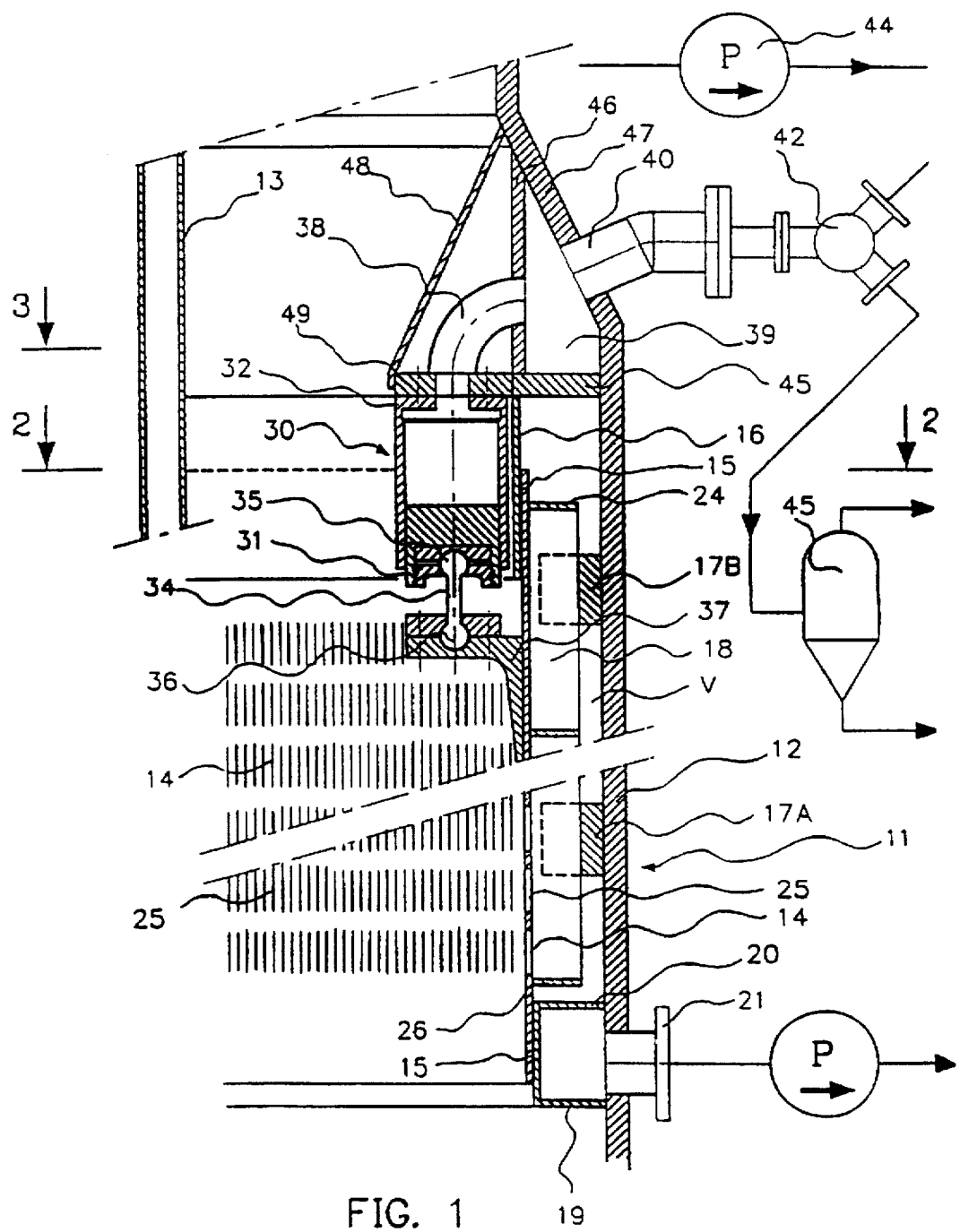
FIG. 1 is a vertical cross-sectional view of a portion of an exemplary pulp digester illustrating the screens, and associated reciprocating structures, according to the invention.
Figure 2:
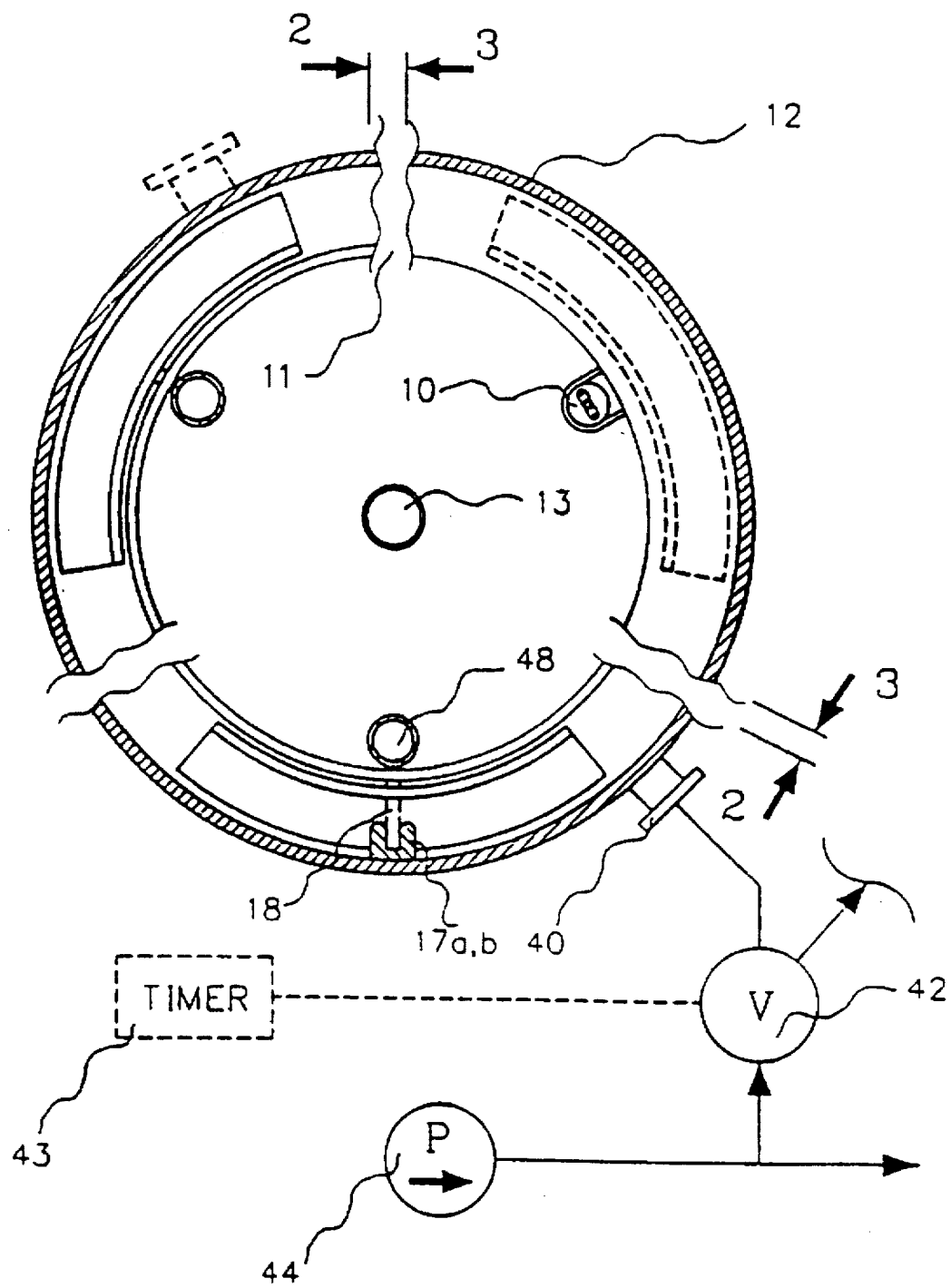
FIG. 2 is a horizontal cross-sectional view of the vessel of FIG. 1 taken along lines 2—2 and 3—3, and schematically showing typical components associated therewith.

A structure according to the present invention is shown in FIGS. 1 and 2. The structure is associated with a vessel 11 for vertically passing fibrous materials suspended in liquid, preferably a continuous pulp digester. The vessel has a vertical wall 12 curved about a vertical axis (e.g. circular in diameter). A central liquid distribution pipe 13 conventionally is provided for introducing treatment liquid into the material column, which liquid subsequently is removed through screening structures 14. A plurality of structures 10 according to the present invention are mounted in the vessel 11 around the interior perimeter thereof, as seen in FIG. 2.

Each structure 10 according to the present invention comprises a vertically elongated screening member 14, curved about a vertical axis, and having a curvature fitting the vessel wall 12. Means are provided for mounting the screening member 14 inside and adjacent the vertical wall 12 for up and down reciprocal movement, defining a screening volume V between the screening member 14 and the vertical wall 12. Also substantial sealing of the volume V from the interior of the vessel 11 is provided, except through the screening member 14 and small (e.g. 2–5 mm) gaps 15 providing clearance and acting as part of the screen area. Such mounting means, as illustrated in FIG. 1, includes the inner walls 16 above the screening member 14, U-guides 17 in the volume V affixed to the wall 12. A vertically extending guide plate 18 is affixed to the screening member 14. A header 19 having quadrate cross-section is arranged below the screening member 14. A plurality of vertically extending passageways 20 are provided in the header 19 distributed regularly over the width Of the screen to allow liquid flow from the volume V out through the vessel wall 12 through conduit 21.

For the particular structure configuration illustrated in FIG. 1 an upper horizontally disposed bar 24 is affixed to the actual screen face 25, which face 25 may be slotted (see FIG. 1), may be formed by staves, or may have other types of openings formed therein. At least one other horizontal bar 26, like the bar 24, is provided parallel to, but spaced from, the bar 24. A pair of vertically extending plates 18 interconnecting the bars 24, 26 define the guide plate 18 therebetween. This guide plate 18 is positively guided by means of the U-shaped guides plates 17A, 17B which form a gap them between within which the guideplate movably resides. The guide plate 18 preferably slides on the inwardly directed surface of each U-guide 17, in order to define the gap 15 and also form a part which is inexpensive and easy to exchange.

Means are also provided for reciprocating the screening member 14 vertically up and down with respect to the wall 12. The reciprocating means preferably comprises a piston and cylinder assembly 30, including piston 31 and cylinder 32. Preferably only a single cylinder 30 is provided for each screening member 14, and is mounted on the inside and above the screening member 14 on a horizontal shelf 49 which protrudes into the vessel 11 outside the screening volume. Means are provided for operatively attaching the piston 31 to the screening member 14. Preferably such means takes the form of universal joint means, such as (see FIG. 1) a rod 34 having a ball-shaped head 35, 36 at each end thereof, and means, such as packings for rotatably receiving the ball-shaped heads in each of the piston 31 and screening member 14. Preferably the lower head 36 is rigidly affixed to a support. 37 which is mounted on the screen face 25. This attachment provides for a beneficial point of attack of the power from the piston on the screen element 14 resulting in a balanced movement without any substantial tilting forces.

A fluid channelling means 38, 39, 40 is operatively connected to the top of the piston 31 and to a mechanism for selectively supplying fluid to the cylinder 32. The fluid channelling means; comprises a conduit 38 which leads from the top of the cylinder 32 into a second header 39. This header 39 is preferably arranged with only one outer inlet conduit 40 for the supply and withdrawel of fluid from a plurality of cylinders 32. The second header 39 is delimited in the bottom region by means of an horizontal annular plate 45 and on the inside by means of a vertical cylinder 46 which generally is a prolongation of the upper vessel wall. The outside of the upper header 39 is delimited by an annular tapered wall portion 47, so that the cross-section of the header volume forms a triangular space.

The outer inlet conduit 40 is mounted onto the tapered portion 47 of the header 39. The control mechanism of the movable screen preferably takes the form of a two-way valve 42. The valve 42 is selectively operated—such as by a timer 43 as illustrated in FIG. 2 (or manually, etcetera)—to connect either a source of fluid under pressure or a vent to the top of piston 31. Preferably the source of fluid under pressure would be a conventional high pressure liquid pump 44 usually provided in digesting assemblies. The vent would be a flash tank 45 or the like. The downstroke of the piston 31 preferably takes about 1 min whereas the upstroke, takes only about 1 second and the high pressure pump (e.g. of an ordinary kind) preferably has capasity to serve a number of screen girdles (indicated by a dotted line in FIG. 1). Digester pressure (e.g. 8–20 Bar) is always supplied to the bottom of the piston 31.

In order to protect the conduit connected to the cylinder 32 and the shelf 49 these parts are covered by a tapered plate 48, which preferably has the form of a cone which has been divided into two halfs along the central axis. This plate 48 also has the object of avoiding hanging points for the downwardly moving chips. It should be noted that the total area that these tapered plates 48 project in a transverse direction of the vessel forms an insignificantly small portion of the total area (filled with pulp) and accordingly these protruding parts 48 will have no significant effect on the passing chip column. The plate 48 can also be designed to fulfil the function of conduit 38, and accordingly form an integral conduit and cover plate 48.

Alternatively the header 19 could be eliminated, and the entire screening member 14 mounted closer to the vessel wall 12. The withdrawal conduit 21 then would merely penetrate the wall 12 directly into the volume V, with a straight horizontal passage from the volume V into the conduit 21.

Exemplary operation of the apparatus according to the invention will now be specifically described with respect to the drawing.

Fibrous material suspended in liquid (chip column), such as paper pulp, is introduced into the top of the vessel 11, passing downwardly therein past the screening member 14. With the cylinder 32 of the assembly 30 thereof connected to the vent 45, the pressure inside the vessel will act on the bottom of piston 31 and cause the screening member 14 to move quickly upwardly (e.g. 1 second) causing the screen face 25 to unclog. Once an upper limit of travel is reached, which may be approximated by the passage of a particular time, the cylinder 32 is connected to a high pressure liquid source 44, causing the piston 31 to drive the screening member 14 downwardly, preferably without any relative movement between the screen face 25 and the pulp. This is continuously repeated, with liquid passing through the screen face 25 and the clearance gaps 15 being withdrawn through the conduit 21 and the cylinder 32 alternately being connected to high pressure vent. The screening member 14 is positively guided by the plates 17, 18, etcetera throughout. Alternatively the screens 14 can be moved in relation to the dp (differential pressure) over its screen face, e.g. the screen is moved to the downmost position and moved upwardly when the dp has reached a certain level. Accordingly in a preferred mode the screen is positioned for a while in the downmost position and as soon as the dp has reached the predetermined level the screen will be quickly moved to the uppermost position, whereby it is being rinsed and thereafter again moved slowly downwardly. It may also be positioned for a while in the uppermost position.

Thanks to the positioninining of the pistons on the inside of the screen face 25, the pressure acting upon them will always be the same, since all pistons are housed within the same highly pressurised volume, i.e. there are no screens dividing them into different volumes which might have different pressures.

A further advantage with a design according to the invention is the elimination of conduits, which had to be used according to a prior art solution. Furthermore the use of an upper header also provides for only using one supply channel 40 instead of one for each piston as in a prior arrangement. A further advantage is that an assembly according to the invention is relatively easy to fit and to inspect from the inside of the vessel.

It will thus be seen that according to the present invention a simple, efficient mechanism and method for keeping screens in digesters, or the like, free from clogging and tilting has been provided. While the invention has been here shown and described in what is presently concieved to be the most practical and preferred embodiment thereof it will be apparent to those of ordinary skill in the art that many modifications may be made within the scope of the invention. For instance the shown use of three assemblies is of course only exemplary and could instead be four, five, or more assemblies. Of course other per se known guiding means could be used instead of the guideplate is and U-guides 17. Furthermore the form of the plate 48 could be made more edgy. Moreover it should be understood that this screen arrangement could be operated in a manner which almost causes a back flushing effect during the up-ward stroke, by means of dividing the lower header into two or more compartments and by not withdrawing liquid from at least one compartment during up-stroke (from one or more sectors), in order to rinse the screens even more effectively (by eliminating the dp over that screen) if desired. In a preferred example the vessel (11) is intended for operation wherein the temperature within the different cooking zones are substantially the same, e.g. the temperature within the different zones of the digester lies within an interval of 4° C., preferably between 150° and 165° C.

We claim:

1. A structure for vertically passing fibrous material suspended in liquid through a vessel having a vertical wall curved about a vertical axis, said structure comprising:
   a vertically elongated screening member, curved about a vertical axis;
   means for mounting said screening member inside and adjacent the vertical wall of the vessel, for up and down reciprocal movement, defining a screening volume between the screening member and the vertical wall, and for substantially sealing the screening volume from the interior of the vessel, except through the screening member and clearance gaps between the screening member and the vessel wall, during reciprocation of the screening member; and
   means for reciprocating said screening member vertically up and down with respect to the vertical wall, said reciprocating means comprising:
   a piston and cylinder assembly;
   means for operatively attaching said piston to said screening member;
   a fluid channelling means operatively connected to one side of said piston and to a pressure controlling means, a pressure within the vessel acting on the other side of said piston; and
   means for selectively operating said pressure controlling means;
   wherein said piston and cylinder assembly are mounted between a center of the vessel and an inside of said screening member.

2. A structure according to claim 1, wherein said channelling means comprises a header.

3. A structure according to claim 2, wherein said channelling means further comprises a rigid conduit interconnecting said cylinder with said header.

4. A structure according to claim 3, wherein said conduit is integral with a protective plate mounted on top of the piston and cylinder assembly.

5. A structure according to claim 2, wherein a plurality of piston and cylinder assemblies are provided for reciprocating a plurality of screen members, and said header is supplied by a number of supply conduits which number is independent of the number of piston and cylinder assemblies.

6. A structure according to claim 5, wherein said number of supply conduits is less than five.

7. A structure according to claim 5, wherein said number of supply conduits is not more than two.

8. A structure according to claim 5, wherein said number of supply conduits is one.

9. A structure as recited in claim 1, wherein said vessel has a plurality of different cooking zones and wherein temperature, within the different cooking zones are substantially the same.

10. A structure according to claim 1, wherein said vessel is a continuous pulp digestion vessel.

11. A structure according to claim 1, wherein said piston and cylinder assembly is arranged in close proximity to an inner face of the screening member.

12. In combination, a vertically elongated vessel and a reciprocal movable screen, comprising:
   a vertically elongated vessel having a vertical wall curved about a vertical axis;
   a vertically elongated screening member, curved about a vertical axis;
   means for mounting said screening member inside and adjacent the vertical wall of the vessel, for up and down reciprocal movement, and for substantially sealing a space outside of said screening member from an interior of the vessel, except through the screening member and clearance gaps between the screening member and the vessel wall; and
   means for reciprocating said screening member vertically up and down with respect to the vertical wall, said reciprocating means comprising:
   a piston and cylinder assembly;
   means for operatively attaching a first side of said piston and cylinder assembly to said screening member and a second side of said piston and cylinder assembly to the wall of the vessel;
   a fluid channelling means for connecting one side of the piston and cylinder assembly to a pressure controlling means, a pressure within the vessel acting on the other side of said piston and cylinder assembly; and
   means for selectively operating said pressure controlling means to reciprocate said screening member;
   said piston and cylinder assembly being mounted in the interior of said vessel between a center of the vessel and an inside of said screening member.

13. A structure according to claim 12, wherein a plurality of piston and cylinder assemblies are provided for reciprocating a plurality of screen members, respectively, and a header communicates pressure from a single supply conduit of said pressure controlling means to said plurality of piston and cylinder assemblies.

14. A structure according to claim 13, wherein said piston and cylinder assemblies are each arranged in close proximity to an inner face of a respective screening member.

* * * * *